United States Patent
Baldrick et al.

(10) Patent No.: US 10,366,390 B2
(45) Date of Patent: Jul. 30, 2019

(54) AUTOMATIC REFRESH AUTHORIZATION FOR EXPIRED PAYMENT TRANSACTION AUTHORIZATIONS

(75) Inventors: Mark Baldrick, Lisburn (IE); Sanjeeva Kumar, Dublin (IE)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 13/599,739

(22) Filed: Aug. 30, 2012

(65) Prior Publication Data

US 2013/0080327 A1 Mar. 28, 2013

Related U.S. Application Data

(60) Provisional application No. 61/538,745, filed on Sep. 23, 2011.

(51) Int. Cl.
| | | |
|---|---|---|
| G06Q 40/00 | (2012.01) | |
| G06Q 20/40 | (2012.01) | |
| G06Q 20/10 | (2012.01) | |
| G06Q 20/24 | (2012.01) | |

(52) U.S. Cl.
CPC ............ *G06Q 20/40* (2013.01); *G06Q 20/10* (2013.01); *G06Q 20/24* (2013.01); *G06Q 40/00* (2013.01)

(58) Field of Classification Search
CPC ......... G06Q 20/40; G06Q 20/10; G06Q 40/00
USPC .......... 705/39, 44, 40, 35, 64; 235/379, 380, 235/381
See application file for complete search history.

(56) References Cited

U.S. PATENT DOCUMENTS

| | | |
|---|---|---|
| 6,332,134 B1 | 12/2001 | Foster |
| 7,558,758 B2 | 7/2009 | McCarthy et al. |
| 7,844,546 B2 | 11/2010 | Fleishman et al. |
| RE42,760 E | 9/2011 | Kuo |
| 8,332,378 B2 * | 12/2012 | Clayton et al. ............... 707/706 |
| 2002/0132662 A1 * | 9/2002 | Sharp et al. .................... 463/25 |
| 2003/0118167 A1 * | 6/2003 | Sammon et al. ........ 379/202.01 |
| 2003/0126079 A1 * | 7/2003 | Roberson et al. .............. 705/40 |
| 2004/0073503 A1 * | 4/2004 | Morales et al. ................ 705/35 |
| 2005/0038738 A1 | 2/2005 | Peck et al. |

(Continued)

OTHER PUBLICATIONS

Clark, Ken "Trust, But Verify" Aug. 2004, Chain Store Age, 80, 8, p. 174.*

(Continued)

*Primary Examiner* — Kelly S Campen
(74) *Attorney, Agent, or Firm* — Kilpatrick, Townsend & Stockton LLP (57) ABSTRACT

An automatic refresh authorization for payment transaction authorizations that are estimated to be expired can be determined 'in house' by a payment service provider without the need for human intervention or additional information from a merchant. If several days have gone by since a credit card payment was authorized (but not settled), a reauthorization can be automatically initiated so that a subsequent capture/settlement request will successfully transfer funds. The threshold number of days/hours can be customized by the payment service and/or merchant and may be directed to certain payment processors with high fees only. If the reauthorization fails, a capture request based on the original authorization can be attempted in order to document the denied capture request for the merchant.

19 Claims, 9 Drawing Sheets

(56) References Cited

U.S. PATENT DOCUMENTS

| | | | |
|---|---|---|---|
| 2006/0265339 A1* | 11/2006 | Vakil et al. | 705/76 |
| 2008/0120214 A1* | 5/2008 | Steele et al. | 705/35 |
| 2010/0070336 A1* | 3/2010 | Koegler et al. | 705/10 |
| 2010/0114775 A1 | 5/2010 | Griffin | |
| 2011/0119178 A1* | 5/2011 | Clayton et al. | 705/39 |
| 2011/0119188 A1* | 5/2011 | Clayton et al. | 705/44 |
| 2011/0119189 A1* | 5/2011 | Clayton et al. | 705/44 |
| 2011/0119274 A1* | 5/2011 | Clayton et al. | 707/747 |
| 2011/0208649 A1 | 8/2011 | Shader | |
| 2012/0030121 A1* | 2/2012 | Grellier | 705/67 |

OTHER PUBLICATIONS

Papworth, Jill "Money; Guard Your Christmas Cards; Buying Online: Shoppers Are Expected to Spend a Record Pounds 5BN This Year" Nov. 26, 2005; The Guardian p. 7.*

* cited by examiner

AUTOMATIC REFRESH AUTHORIZATION FOR EXPIRED PAYMENT TRANSACTION AUTHORIZATIONS

CROSS-REFERENCES TO RELATED APPLICATIONS

This application claims the benefit of U.S. Provisional Application No. 61/538,745, filed Sep. 23, 2011, which is hereby incorporated by reference in its entirety for all purposes.

BACKGROUND

1. Field of the Art

Generally, the present application relates to methods, systems, and devices for financial data processing. Specifically, automatic refreshing of back-end authorizations of credit card and other payment transactions by payment service providers is presented.

2. Discussion of the Related Art

Accepting credit card, debit card, prepaid card, and other payment cards is a given for many retail merchants. For online merchants, accepting PayPal® payments, Google Checkout™ payments, and other alternate electronic payment types in addition to traditional credit card payments is becoming more common. Interfacing with the plethora of payment brands that customers expect to be available for payment transactions can be daunting, especially given the regulatory burden of financial regulations, industry standards, and security considerations.

Differing government regulations in different countries, as well as among card associations, presents much of the burden. Merchants who sell and ship goods to consumers in various countries are, of course, expected to comply with all such regulations. The rise of Internet commerce has all but eliminated barriers to consumers finding desired products, and international shipping has enabled merchants to deliver their products to those consumers. However, the exposure to so many differing markets, and the associated burdens, can be especially difficult for small merchants.

Some merchants contract with third-party payment service providers in order to facilitate interfacing with the different types of payment networks. CyberSource of Mountain View, Calif., is one such third party payment service provider.

Third-party payment service providers not only take care of maintaining interfaces between a contracting merchant and payment networks, they also offer other services such as risk management, hosted order pages (e.g., redirected online checkout web pages), and silent order posts (e.g., secure fields for a merchant's online checkout web page). These services are in addition to servicing the typical day-to-day payment transactions of merchants.

In a typical payment transaction, a merchant sends an authorization request for a consumer's payment to the third-party payment service provider, and the third-party payment service provider forwards the authorization request to the proper entity. This entity often is one of many vendors with which the third-party payment service contracts. The entity then obtains an approval for the authorization request—an "authorization"—from the customer's bank through an acquirer or through a card association. The authorization confirms that the customer indeed has money (or credit) in his or her account to pay for the transaction and also locks down or otherwise reserves the money (or credit) in the account.

For example, a merchant sends an authorization request for a customer's credit card payment transaction to CyberSource. CyberSource sends the request to a payment processor, such as Atos Worldline of France. Atos sends the request to a bank (i.e., the acquirer). The bank then obtains an authorization for the request through a card association's network, such as VisaNet™, from the customer's bank that issued the credit card (i.e., the issuer) to the consumer.

In a brick-and-mortar retail store, authorization and capture often occurs in real-time, or synchronously, as the customer waits at the register. For an online store, the time between authorization and capture can be delayed. However, the authorization portion is contemporaneous with checkout so that approval occurs and an order email may be sent before the customer leaves the merchant's web site.

Later at the end of the day, or when the product has shipped, the merchant sends a settlement request to the payment service provider in order to "capture" the funds. That is, a request is made to actually initiate the transfer of the previously authorized and reserved money (or credit) from the customer's account to the merchant's bank account.

This non-real-time, asynchronous request is often bundled with other settlement requests in a "batch file." A batch file need not be in a file per se; there are other methods of sending this information. For example, a database may be sent instead of a file, or the settlement request can be sent via messaging.

For example, the acquirer may send a batch file at 8:00 pm each evening in order to collect money for its merchants. The bank's batch files can be extremely large due to the ubiquity of the bank's services and global reach.

In some cases, a long time may elapse between authorization and when the product ships. This can be especially true for orders in which customization must be performed on the product, which may take several days or weeks. This poses a problem because transactions need to be settled within a reasonable amount of time after authorization.

Some payment processors allow a delay of around 5-7 days between when an authorization request is authorized and a capture/settlement request is sent. If a capture request occurs after the 5-7 days, the money (or credit) may no longer be reserved in the customer's account. Any such locked down funds are released for other uses by the customer. Obtaining a new authorization for the same transaction can be a burdensome, manual process because of the many layers of bureaucracy, accounting, and fraud prevention that occur in the background.

There is a need in the art for more efficient payment transaction interfacing.

BRIEF SUMMARY

The present disclosure is generally related to payment service provider re-authorizations in response to 'late' capture requests by a merchant. If an original authorization for a payment is estimated to have expired by the time a merchant sends a capture request to the payment service provider, then the payment service provider can regenerate a new authorization request and use the resulting authorization for the capture/settlement request through a payment processor. If the re-authorization is rejected, then the original capture/settlement request is sent to the payment processor so that the results (usually denial) can be sent to the merchant. If the re-authorization is approved, then a capture/settlement request based on the re-authorization is sent to the payment processor immediately thereafter.

The merchant itself can estimate the expiration of the original authorization and send a re-authorization if necessary. However a middleman, such as a payment service provider, can shield the merchant from this complexity, effectively encapsulating the authorization and capture request functions. This encapsulation takes the burden off of the merchant of worrying about all the transaction handshaking details.

Time thresholds for the estimation can be automatically adjusted based on the denial or approval of the re-authorization. If the re-authorization is approved, that can indicate that the original authorization had already expired and that the time threshold should be adjusted downward.

Some embodiments of the present invention are directed to a method of refreshing authorizations for expired payment transactions. The method includes sending to a payment processor a first request for a first authorization corresponding to a payment transaction, receiving from the payment processor an approval for the first authorization, estimating, using a computer operatively coupled with a memory, whether the first authorization has expired, automatically generating a second request for a second authorization corresponding to the payment transaction based on an estimation that the first authorization corresponding to the payment transaction has expired, and automatically sending to the payment processor the second request for the second authorization.

The method can include receiving from the payment processor a rejection for the second authorization, automatically sending to the payment processor a capture request corresponding to the first authorization based on receiving the rejection for the second authorization, and receiving from the payment processor a response, such as a rejection, for the capture request. Alternatively, the method can include receiving from the payment processor an approval for the second authorization and automatically sending to the payment processor a capture request for the second authorization based on receiving the approval for the second authorization.

Some embodiments are directed to a method of refreshing authorizations for expired payment transactions. The method includes receiving from a merchant a merchant authorization request for a payment transaction, sending to a payment processor a first request for a first authorization corresponding to the payment transaction, receiving from the payment processor an approval for the first authorization, sending to the merchant an approval for the merchant authorization request, and receiving from the merchant a merchant capture request for the payment transaction. The method further includes estimating, using a computer operatively coupled with a memory, whether the first authorization corresponding to the payment transaction has expired, the estimating initiated based on the receipt of the merchant capture request from the merchant, automatically generating a second request for a second authorization corresponding to the payment transaction based on an estimation that the first authorization corresponding to the payment transaction has expired, and automatically sending to the payment processor the second request for the second authorization.

Some embodiments are directed to a method of calibrating capture request timing for expired payment transactions. The method includes sending to a payment processor a first request for a first authorization corresponding to a payment transaction, receiving from the payment processor an authorization response for the first authorization, estimating, using a computer operatively coupled with a memory, whether the first authorization has expired by comparing a time that has elapsed since the first authorization to a threshold time, automatically generating a second request for a second authorization corresponding to the payment transaction based on the comparison, automatically sending to the payment processor the second request for the second authorization, receiving from the payment processor an approval or rejection for the second authorization, and automatically adjusting the threshold time for future payment transactions based on the received approval or rejection for the second authorization.

Other embodiments of the invention are directed to computer readable tangible media comprising code for performing the above-described methods as well as systems, apparatuses and devices that perform the methods and/or that use the computer readable media.

These and other embodiments of the invention are described in further detail below.

DETAILED DESCRIPTION

Generally, methods, systems, and devices are disclosed that relate to re-authorization logic to facilitate payment transaction settlements for which corresponding authorizations have expired.

Estimating whether an authorization for a payment transaction has expired before a corresponding capture/settlement request is sent can save a merchant fees and/or fines from some payment processors. That is because some large payment processors impose fees and/or fines if a capture request is sent to them and there is no corresponding pending authorization. To avoid the fees, one can estimate whether a previous authorization has timed out or otherwise expired, and if so, a re-authorization can be generated and sent.

As a third party, a payment service provider can act as a buffer in order to insulate a merchant from such fees by a payment processor. Upon receiving a capture request from a merchant, the payment service provider can estimate whether the corresponding authorization request expired.

An expired authorization request can occur when the merchant waits past a certain threshold of time before sending a corresponding capture/settlement request. This can happen accidentally, but it is commonly associated with customized, luxury goods. For example, a customer can order a customized necklace online. A week may pass between the time that the customer's card issuing bank authorizes the purchase (at the time the customer enters his or her credit card number online) and the time that the necklace is assembled and shipped. In the prior art, a capture/settlement request referencing the authorization may simply be denied, causing accounting and collection headaches for the merchant. If the merchant is involved in many customized goods that take time to ship, then the fees or extra payments associated with the denials may add up.

Certain payment processor authorization requests become expired approximately 6-7 days after the initial request is received. Typically if a merchant attempts to capture against an expired authorization transaction, the payment processor will reject the capture request.

Technical advantages of aspects of the present invention are many. When an intermediary payment service provider determines that the transaction authorization has gone stale before a capture request is sent to the payment processor, the capture request can be halted before it incurs fees and/or fines for the merchant. This determination can be conducted solely by comparing timestamps and does not need excess additional information, and it can be conducted in large batches by a computer. The payment service provider does not have to wait for a failure of a capture/settlement request. It has been determined that doing so may not be worth the performance overhead, and it would not fit with a synchronous model.

Figure 1:
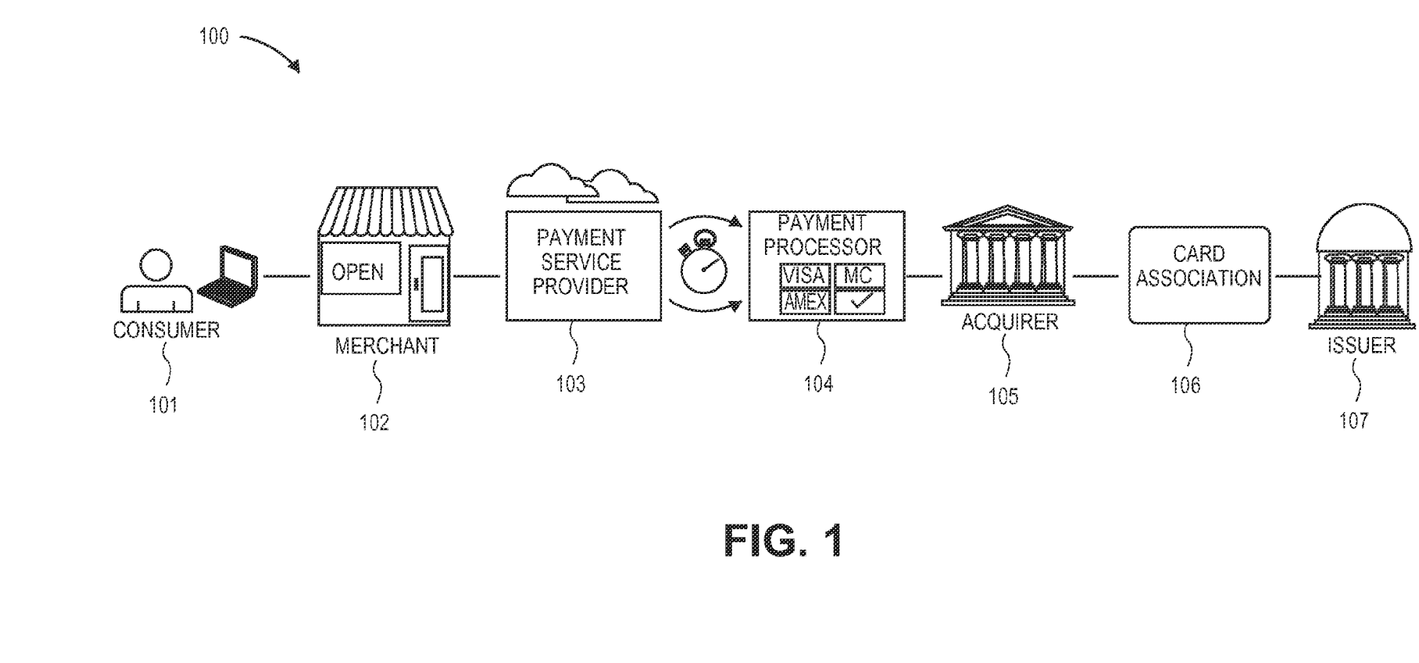
FIG. 1 shows a chain diagram of actors involved in a payment transaction in accordance with an embodiment.

FIG. 1 shows a system of actors that can be used for conducting a payment transaction. For simplicity of illustration, one consumer, one merchant, one payment service provider, one payment processor, one acquirer, one card association, and one issuer are shown. It is understood, however, that embodiments of the invention may include multiple consumers, merchants, payment service providers, payment processors, acquirers, card associations, and issuers. In additional, some embodiments may include fewer than all of the actors shown in the figure. For example, a payment service provider may not be used by the merchant. Also, the actors in the figure may communicate via any suitable communication medium (including the Internet) using any suitable communication protocol.

System 100 includes consumer 101, which may be an individual, or an organization such as a business that is capable of purchasing goods or services. Consumer 101 may operate a client computer. The client computer can be a desktop computer, a laptop or tablet computer, a wireless phone, a personal digital assistant (PDA), etc. It may operate using any suitable operating system including a Windows™ based operating system. The client computer may be used to interact with merchant 102 (e.g., via a merchant website).

A consumer device which identifies a payment account of the consumer for a purchase may be in any suitable form. For example, suitable consumer devices can be hand-held and compact so that they fit into a consumer's wallet and/or pocket (e.g., pocket-sized). They may include smart cards, ordinary credit or debit cards (with a magnetic strip and without a microprocessor), keychain devices (such as the Speedpass™ commercially available form Exxon-Mobil Corp.), etc. Other examples of portable consumer devices include cellular phones, PDAs, pagers, payment cards, security cards, access cards, smart media, transponders, and the like. The consumer devices can also be debit services (e.g., a debit card), credit devices (e.g., a credit card), or stored value devices (e.g., a stored value card).

Merchant 102 can be an individual or an organization such as a business that is capable of providing goods and services. Merchant 102 may have a computer apparatus. The computer apparatus may comprise a processor and a tangible computer-readable storage medium. The computer readable medium may comprise code or instructions for sending a transaction clearing request and receiving a clearing return code.

Merchant 102 may have one or more access devices. Suitable access devices include interfaces and may include point of sale (POS) devices, cellular phones, PDAs, personal computers (PCs), tablet PCs, handheld specialized readers, set-top boxes, electronic cash registers (ECR), automated teller machines (ATM), virtual cash registers (VCR), kiosks, security systems, access systems, and the like. They can interact with consumer devices. For example, consumer 101 using a credit card to purchase a good or service can swipe it through an appropriate slot in the POS terminal. Alternatively, the POS terminal may be a contactless reader, and the consumer device may be a contactless device such as a contactless card. As another alternative, consumer 101 may purchase a good or service via a merchant's website where the consumer enters the credit card information into the client computer and clicks on a button to complete the purchase. The client computer may be considered an access device.

Merchant 102 contracts with payment service provider 103, such as CyberSource, to handle its non-cash payment services. Payment service provider 103 connects with payment processor 104, such as Atos Worldline. Payment service provider 103 can track the time between an authorization request approved by payment processor 104 and a subsequent, corresponding capture request from merchant 102 and determine whether another authorization request is necessary.

In the exemplary embodiment, payment processor 104 acquires an authorization by connecting with acquirer 105. Acquirer 105 is typically a bank that has a merchant account. Acquirer sends an authorization request through card association 106 to issuer 107. Issuer 107 may also be a bank, but it could also be a business entity such as a retail store. Some entities are both acquirers and issuers, and embodiments of the invention include such entities. Acquirer 105 and issuer 107 may each have a server computer and a database associated with the server computer.

Acquirer 105 sends an authorization request message through card association 106's network to issuer 107. Issuer 107 responds by sending an authorization response, such as a denial or approval, back through card association 106's network to acquirer 105.

Acquirer 105 then sends the authorization response back to payment processor 104, who forwards it to payment service provider 103. Payment service provider 103 sends the authorization response back to merchant 102, who continues with or cancels the current transaction.

A capture request follows the same route, going from merchant 102 to payment service provider 103, payment processor 104, acquirer 105, card association 106, to issuer 107, and then back through the chain to payment service provider 103 and merchant 102.

Figure 2:
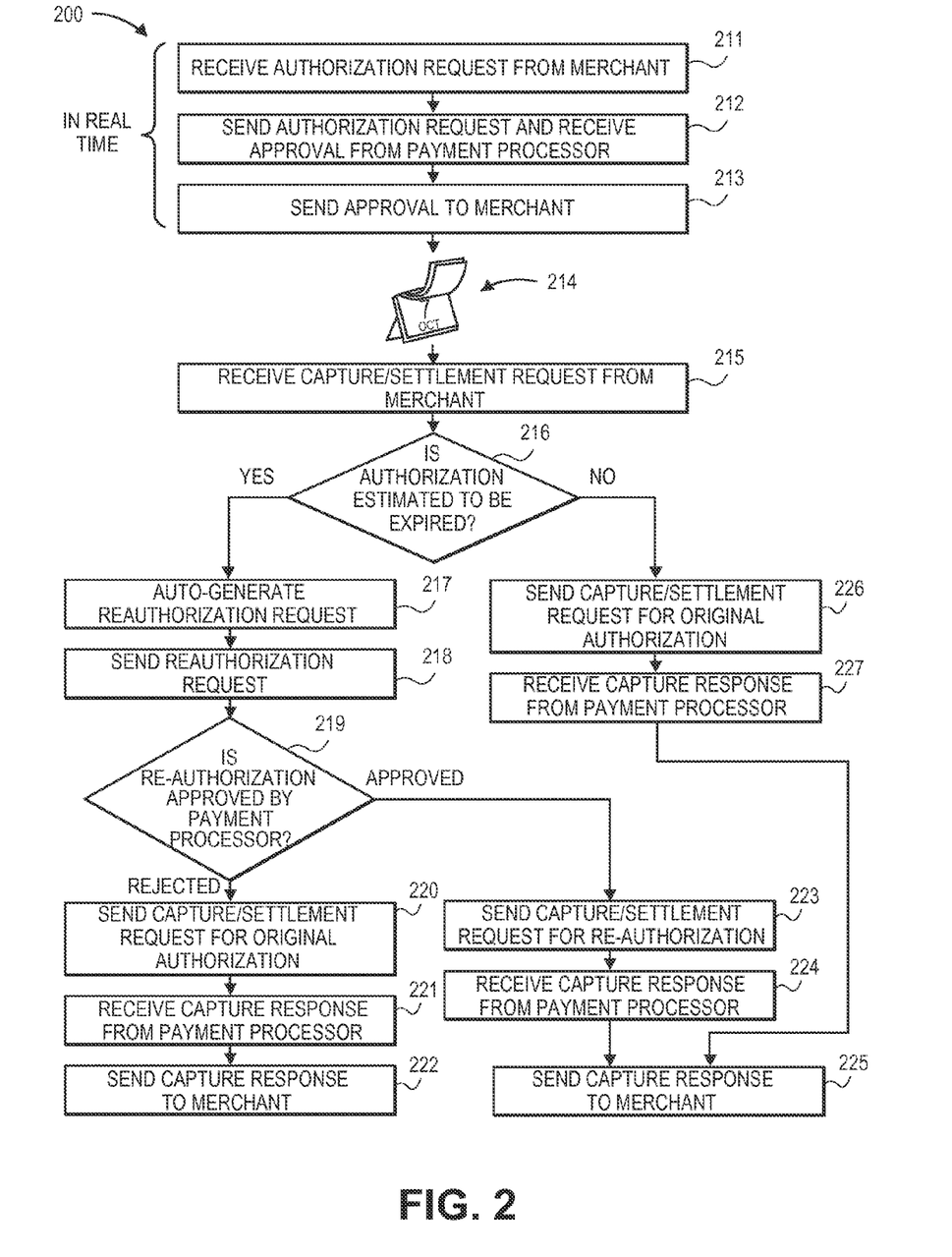
FIG. 2 is a multi-pathed flowchart of a process according to an embodiment.

FIG. 2 is a multi-pathed flowchart of a process according to an embodiment. For a transaction with a consumer a merchant sends an authorization request to its payment service provider. In operation 211, the payment service provider receives the authorization request from the merchant. In operation 212, the payment service provider sends the authorization request to the payment processor and receives approval from the payment processor for the transaction. In operation 213, the payment service provider sends the approval to the merchant.

Then, several days go by, as indicated in 214. After time has elapsed after the authorization, the operations continue.

In operation 215, the payment service provider receives a capture/settlement request from the merchant. In operation 216, the payment service provider estimates whether the authorization expired.

In some embodiments, the estimation is a comparison of the time and date of the approved authorization received for the relevant transaction (e.g., the time that the approval was received in operation 212) to that of the current time. In other embodiments, other factors can be considered. For example, the type of payment processor can be considered or the amount of the transaction.

If it is estimated that the authorization has already expired, then operations proceed to operation 217.

In operation 217, the payment service provider automatically, without direct human intervention, generates a re-authorization request. This re-authorization request may be a subset of the information sent in the original authorization. For example, the re-authorization request may omit payor authentication information and/or card verification number (CVN). This helps because merchants and payment service providers may only hold onto that information for a short time during the initial transaction according to card association regulations. In operation 218, the re-authorization request is sent to the payment processor. In operation 219, the payment services provider determines from the authorization response to the re-authorization request whether the re-authorization is approved.

If the re-authorization is rejected, then the operations continue at operation 220.

In operation 220, the payment service provider sends to the payment processor a capture/settlement request corresponding to the original authorization. In operation 221, it is expected that the payment service provider receives a denial in the capture response from the payment processor. In operation 222, the capture response is sent from the payment service provider to the merchant.

If, in operation 219, the re-authorization is approved, then the operations go to operation 223.

In operation 223, the payment service provider sends to the payment processor a capture/settlement request for re-authorization. In operation 224, the payment service provider presumably receives from the payment processor an approval in the capture response corresponding to the re-authorization. (An approval would not be the case is some instances, such as if the cardholder closed his or her account or if he or she ran down his or her balance so that the purchase could no longer be approved.) In operation 225, the capture response is sent to the merchant.

If, in operation 216, it is estimated that the authorization has not expired, then settlement continues normally. In operation 226, the payment service provider sends a capture/settlement request for the original authorization to the payment processor (without any re-authorizations being generated or sent). In operation 227, the payment service provider receives a capture response from the payment processor for the original authorization. In operation 225, the capture response is sent to the merchant.

Figure 3:
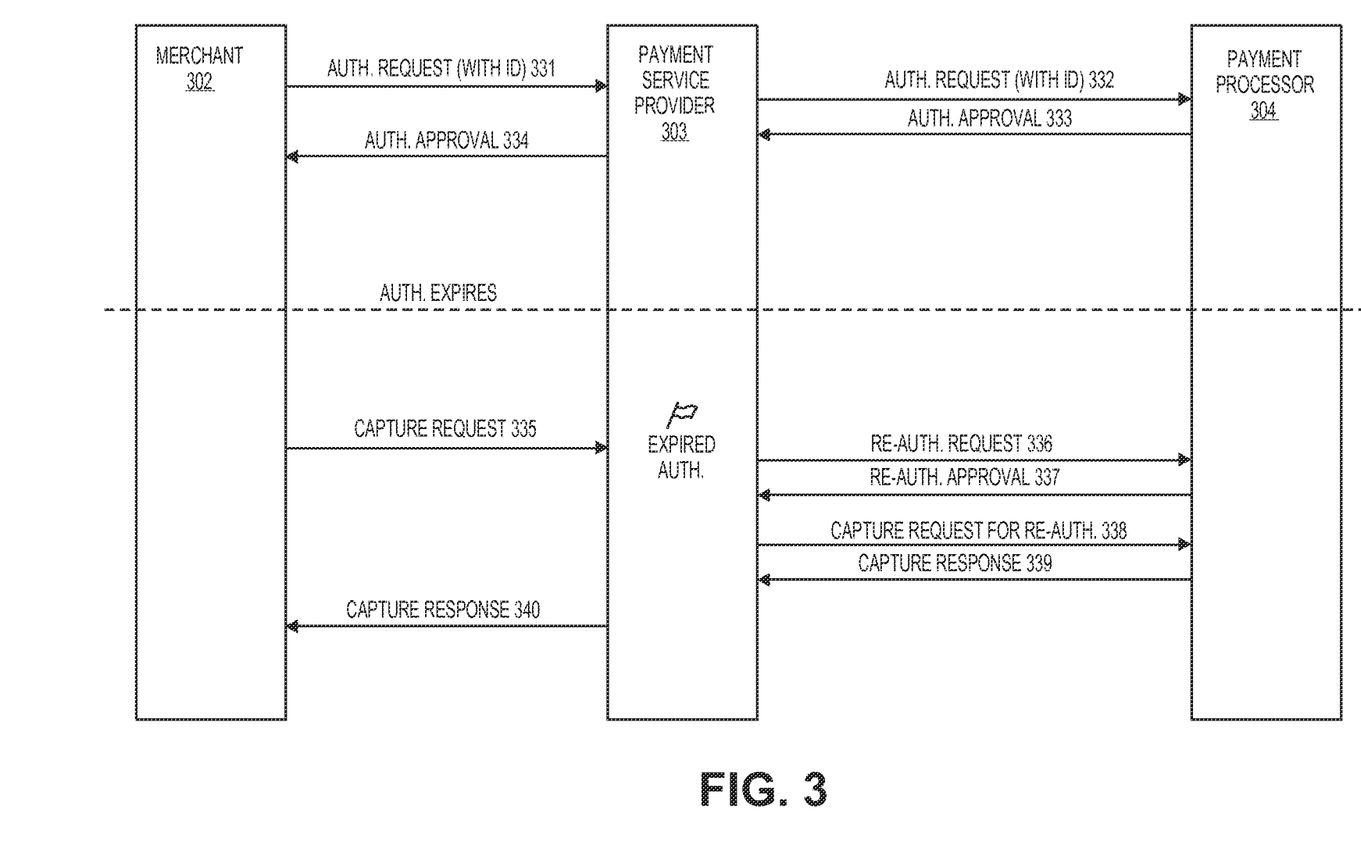
FIG. 3 is a system sequence diagram in accordance with an embodiment.

FIG. 3 is a system sequence diagram in accordance with an embodiment. For a proposed transaction with a customer, merchant 302 sends original authorization request 331 to payment service provider 303. Authorization request 331 is forwarded by payment service provider 303 to payment processor 304 as authorization request 332. Forwarded authorization request 332 may be an exact copy of authorization request 331 or it may be different. Payment processor 304 processes the request in order to determine whether the payment is authorized by the customer's issuer. Authorization response 333, an approval, is sent back from payment processor 304 to payment service provider 303, and payment service provider 303 forwards authorization approval 334 to merchant 302. Authorization response 334 may be an exact copy of authorization response 333 or it may be different.

In this use case, after a certain time the authorization expires after the authorization.

In the exemplary embodiment, the calculation of whether or not the original authorization is expired is configurable. The payment service provider can have a user-selectable, file-enterable configuration setting to determine how long for which a transaction is fresh, to the granularity of days, hours, minutes, seconds, etc. This allows the payment service provider the ability to change refresh logic to ensure optimal use of the functionality.

After expiration of the original authorization, merchant 302 sends capture request 335 to payment service provider 303. Payment service provider 303 looks up the transaction ID in the capture request to determine the authorization to which it refers. Payment service provider 303 compares the timestamps of the original authorization and capture request 335 just received from merchant 302. If the timestamps are different by a predetermined number of days (e.g., 6 days) or hours, then a new authorization request is automatically generated.

New authorization request 336 is generated and sent by payment service provider 303 to payment processor 304, which acquires a new authorization approval. Payment processor then references a new ID in new authorization approval 337.

Capture request 338 is then sent by payment service provider 303 to payment processor 304. Capture response 339 is sent from payment processor 304 to payment service provider 303. Payment service provider 303 can send capture response confirmation 340 to merchant 302. This confirmation may take the form of a line item of a monthly transaction form.

Figure 4:
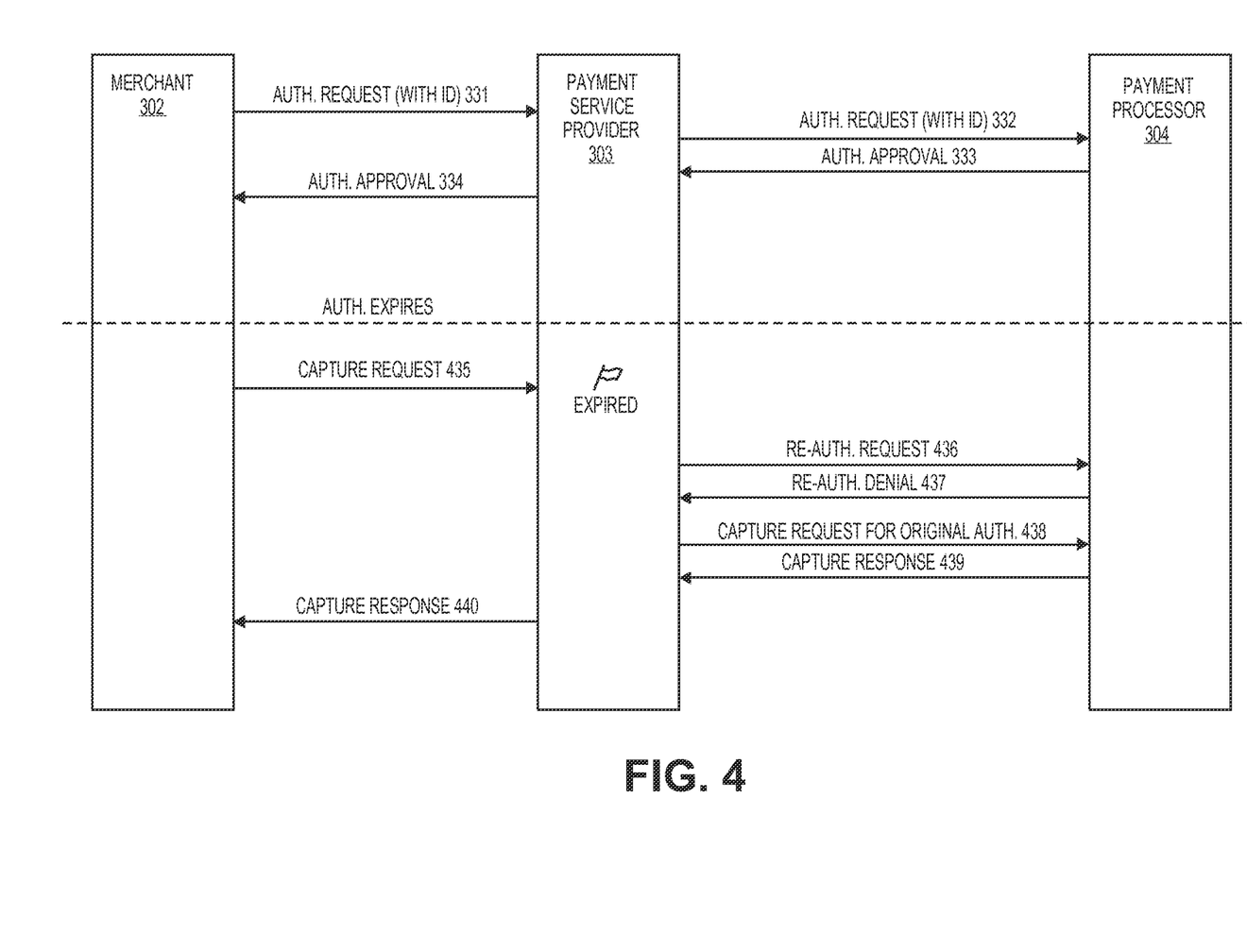
FIG. 4 is an alternate system sequence diagram in accordance with an embodiment.

FIG. 4 is a system sequence diagram in accordance with an embodiment. For succinctness of discussion for this embodiment, messages 331, 332, 333, and 334 are the same as those discussed for the previous figure, and we begin this discussion at message 435.

After expiration of the original authorization, merchant 302 sends capture request 435 to payment service provider 303. Payment service provider 303 looks up the transaction ID in the capture request to determine the authorization to which it refers and compares the timestamps of the original authorization and capture request 435 just received from merchant 302. Because it is estimated that the original authorization has expired, a new authorization request is automatically generated.

New authorization request 436 is sent by payment service provider 303 to payment processor 304, which attempts a new authorization approval. However, in contrast to the embodiment in the previous figure, in this embodiment the new authorization request is denied. Re-authorization denial 437 is sent from payment processor 304 to payment service provider 303 to communicate this. In response, payment service provider 303 sends capture request (for the original authorization) 438 to payment processor 304, which may deny the capture request. Payment processor 304 sends capture response 439 to payment service provider 303, which forwards the denial in capture response 440 to merchant 302.

Figure 5:
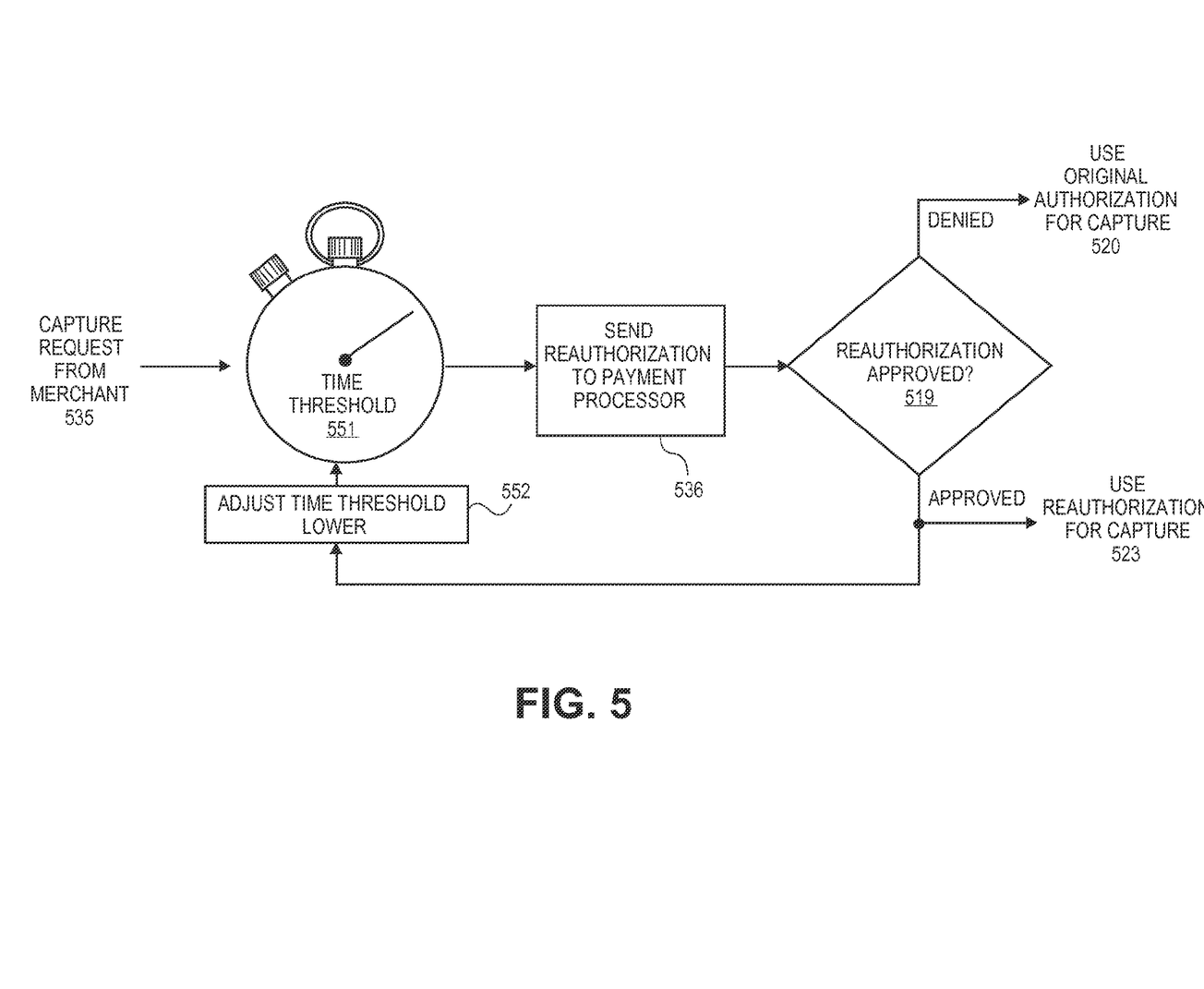
FIG. 5 illustrates an automatic feedback loop for adjusting time thresholds in accordance with an embodiment.

FIG. 5 illustrates an automatic feedback loop for adjusting time thresholds in accordance with an embodiment. In operation 535, a capture request is received from a merchant. The time and date of the received capture request is subtracted from the time and date that the original authorization request was acquired to result in a time difference. The time difference is compared with time threshold 551. If the time difference is greater than time threshold 551 (i.e., the time has expired), then a re-authorization is generated and sent to a payment processor in operation 536. If the re-authorization is denied in operation 519, then the ID for the original authorization is used for a capture request in operation 520. This will presumably result in a denied capture, and the denial can be recorded for accounting purposes. If the re-authorization is approved in operation 519, then the ID for the re-authorization is used for a capture request in operation 523.

In addition, time threshold 551 can be adjusted in operation 552 based on the approval of the re-authorization. For the next capture request, the adjusted time threshold can be used to compare a time difference. This feedback loop allows the threshold to be automatically fine-tuned. If the time threshold is too high, then an approved re-authorization may indicate that the original authorization has long since elapsed. That is, there is no overlap between the time that the original authorization is alive and the time that the re-authorization is sent. Thus, the time threshold can be lowered to the point at which a re-authorization only occurs immediately after an original authorization goes stale. This allows a merchant or payment service provider to fine tune its re-authorization generation algorithms. Other adjustments, such as increasing the threshold time, are contemplated.

Figure 6:
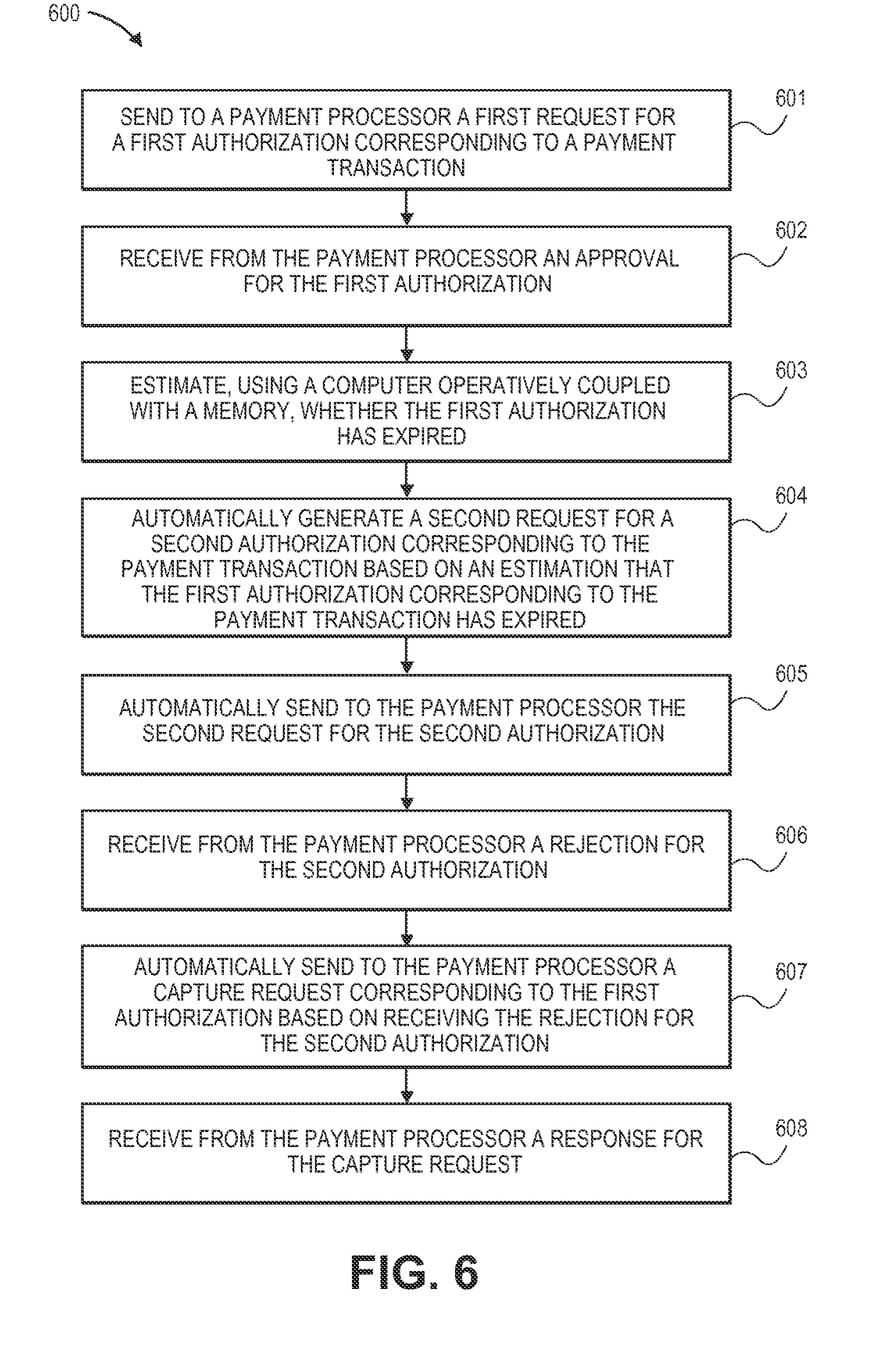
FIG. 6 is a flowchart of a process according to an embodiment.

FIG. 6 is a flowchart of a process according to an embodiment. Process 600 can be implemented by a computer or other machine. In operation 601, a first request for a first authorization corresponding to a payment transaction is sent to a payment processor. In operation 602, an approval for the first authorization is received from the payment processor. In operation 603, it is estimated, using a computer operatively coupled with a memory, whether the first authorization has expired. In operation 604, a second request for a second authorization corresponding to the payment transaction is automatically generated based on an estimation that the first authorization corresponding to the payment transaction has expired. In operation 605, the second request for the second authorization is automatically sent to the payment processor. In operation 606, a rejection for the second authorization is received from the payment processor. In operation 607, a capture request corresponding to the first authorization is automatically sent to the payment processor based on receiving the rejection for the second authorization. In operation 608, a response for the capture request is received from the payment processor.

Figure 7:
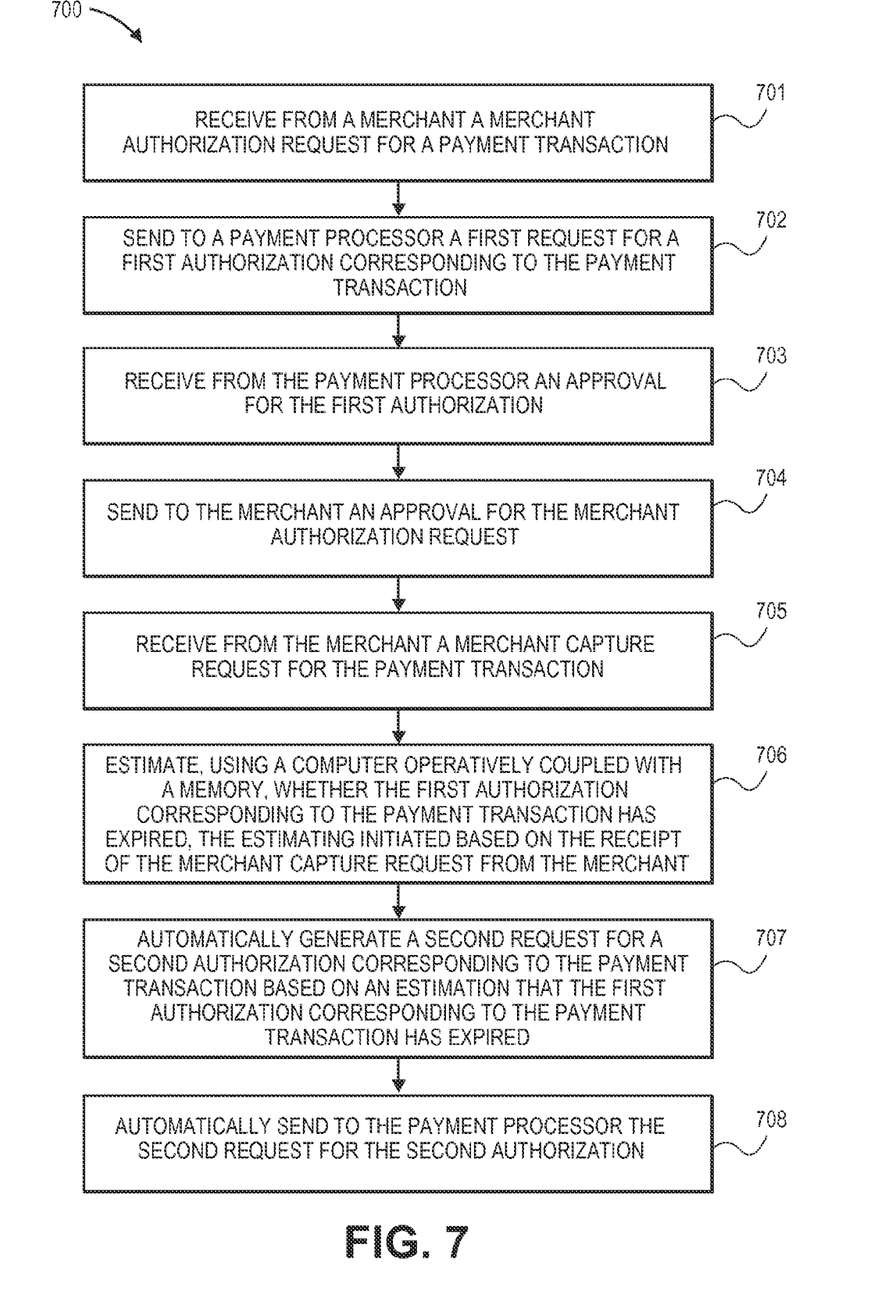
FIG. 7 is a flowchart of a process according to an embodiment.

FIG. 7 is a flowchart of a process according to an embodiment. Process 700 can be implemented by a computer or other machine. In operation 701, a 'merchant' authorization request for a payment transaction is received from a merchant. In operation 702, a first request for a first authorization corresponding to the payment transaction is sent to the payment processor. The merchant authorization request and first request may be identical in content and/or fields. In operation 703, an approval for the first authorization is received from the payment processor. In operation 704, an approval for the merchant authorization request is sent to the merchant. The approval sent back to the merchant may be identical to that received from the payment processor. In operation 705, a merchant capture request for the payment transaction is received from the merchant. In operation 706, a computer operatively coupled with a memory estimates whether the first authorization corresponding to the payment transaction has expired, the estimating initiated based on the receipt of the merchant capture request from the merchant. In operation 707, a second request for a second authorization corresponding to the payment transaction is automatically generated based on an estimation that the first authorization corresponding to the payment transaction has expired. In operation 708, the second request for the second authorization is automatically sent to the payment processor.

Figure 8:
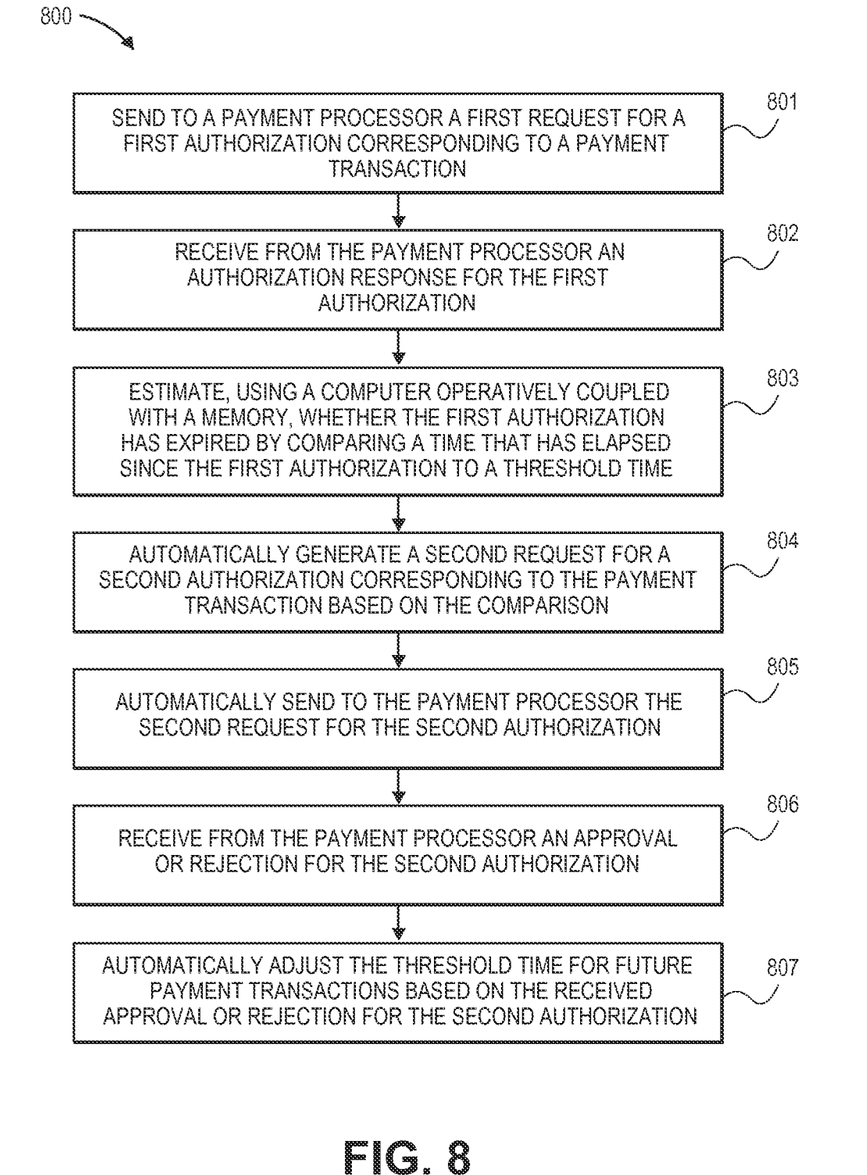
FIG. 8 is a flowchart of a process according to an embodiment.

FIG. 8 is a flowchart of a process according to an embodiment. Process 800 can be implemented by a computer or other machine. In operation 801, a first request for a first authorization corresponding to a payment transaction is sent to a payment processor. In operation 802, an authorization response for the first authorization is received from the payment processor. In operation 803, it is estimated, using a computer operatively coupled with a memory, whether the first authorization has expired by comparing a time that has elapsed since the first authorization to a threshold time. In operation 804, a second request for a second authorization corresponding to the payment transaction is automatically generated based on the comparison. In operation 805, the second request for the second authorization is automatically sent to the payment processor. In operation 806, an approval or rejection for the second authorization is received from the payment processor. In operation 807, the threshold time for future payment transaction is automatically adjusted based on the received approval or rejection for the second transaction.

Figure 9:
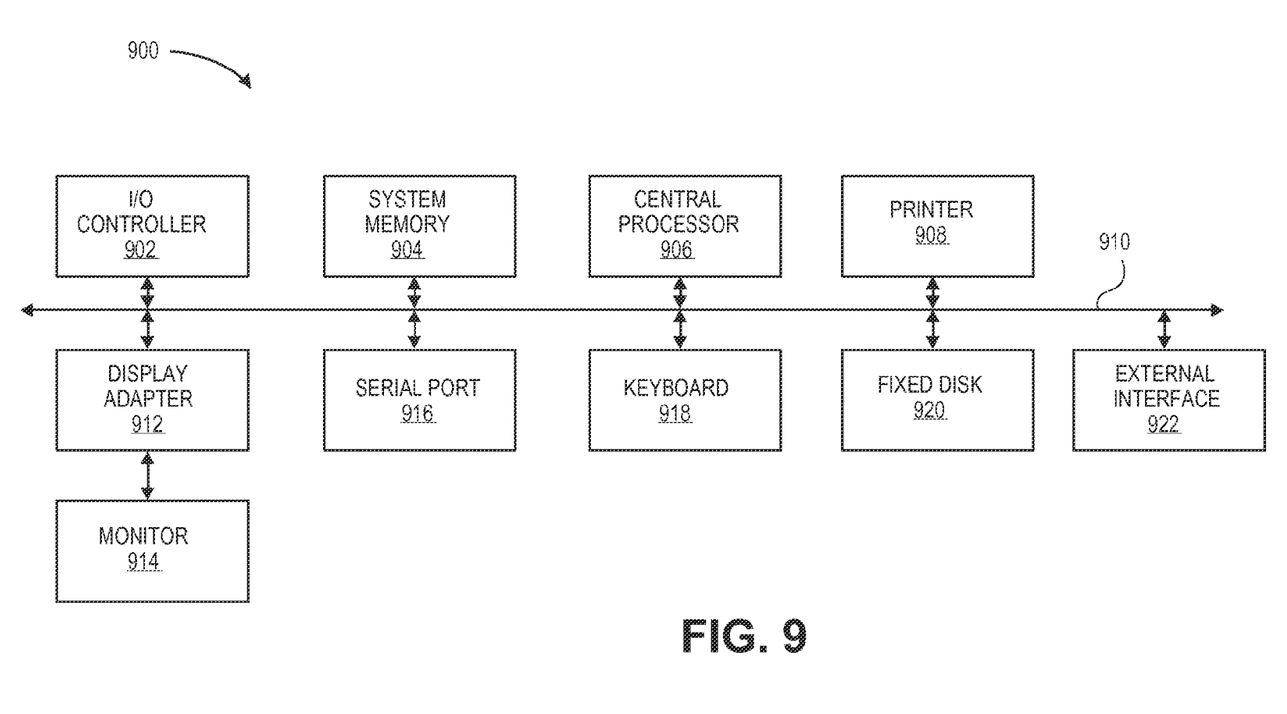
FIG. 9 illustrates an exemplary computer system in which various embodiments can be implemented.

FIG. 9 shows a block diagram of an exemplary computer apparatus that can be used in some embodiments. The subsystems shown in the figure are interconnected via a system bus 910. Additional subsystems such as a printer 908, keyboard 918, fixed disk 920 (or other memory comprising computer readable media), monitor 914, which is coupled to display adapter 912, and others are shown. Peripherals and input/output (I/O) devices, which couple to I/O controller 902, can be connected to the computer system by any number of means known in the art, such as serial port 916. For example, serial port 916 or external interface 922 can be used to connect the computer apparatus to a wide area network such as the Internet, a mouse input device, or a scanner. The interconnection via system bus allows the central processor 906 to communicate with each subsystem and to control the execution of instructions from system memory 904 or the fixed disk 920, as well as the exchange of information between subsystems. The system memory 904 and/or the fixed disk 920 may embody a tangible computer readable storage medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of refreshing authorizations for expired payment transactions, the method comprising:
   receiving, at a payment service provider computer operatively coupled with a memory, an authorization approval message from a payment processor across a network, the authorization approval message confirming that a customer account has money or credit for a payment transaction and that the money or credit has been reserved for a reservation across said network for the payment transaction;
   estimating, by the payment service provider computer operatively coupled with the memory, whether the reservation of money or credit across the network has expired by comparing an elapsed time that has elapsed since the authorization approval message was received across the network to a threshold time;
   automatically generating, at the payment service provider computer operatively coupled with the memory, a request message for re-authorizing the reservation of money or credit in the customer account for the payment transaction based on the elapsed time exceeding the threshold time, thereby obtaining an estimation that the reservation of money or credit across the network has expired;
   automatically sending the request message from the payment service provider computer across the network to the payment processor based on the elapsed time exceeding the threshold time;
   receiving from the payment processor an approval or rejection for the re-authorizing of the reservation;
   automatically adjusting the threshold time for future payment transactions involving the payment processor based on the received approval or rejection, wherein the threshold time is adjusted downward when the re-authorizing of the reservation is approved, and wherein the threshold time is increased for the rejection; and
   sending a subsequent request message to the payment processor for a subsequent payment transaction based on a subsequent elapsed time since a subsequent authorization approval message was received exceeding the adjusted threshold time.

2. The method of claim 1 wherein the rejection for the re-authorizing is received from the payment processor, the method further comprising:
   automatically sending to the payment processor a capture request corresponding to the authorization approval message based on receiving the rejection for the re-authorizing; and
   receiving from the payment processor a response for the capture request.

3. The method of claim 2 wherein the rejection for the re-authorizing is caused by the customer account having been closed.

4. The method of claim 1 wherein the approval for the re-authorizing is received from the payment processor, the method further comprising:
   automatically sending to the payment processor a capture request for the re-authorizing based on receiving the approval for the re-authorizing.

5. The method of claim 4 wherein the capture request is bundled with other settlement requests in a batch file.

6. The method of claim 1 wherein the threshold time is user-selectable.

7. The method of claim 6 wherein the threshold time is user-selectable and is entered by a file.

8. The method of claim 1 wherein the comparing the elapsed time to the threshold time includes comparing dates.

9. The method of claim 1 wherein the threshold time is between six and seven days.

10. The method of claim 1 wherein each operation is performed in only the order shown.

11. The method of claim 1 wherein the request message for re-authorizing the reservation of money or credit omits payor authentication information.

12. A machine-readable non-transitory storage medium embodying information indicative of instructions for causing one or more machines to perform operations comprising:
   receiving, at a payment service provider computer operatively coupled with a memory, an authorization approval message from a payment processor across a network, the authorization approval message confirming that a customer account has money or credit for a payment transaction and that the money or credit has been reserved for a reservation across said network for the payment transaction;
   estimating, by the payment service provider computer operatively coupled with the memory, whether the reservation of money or credit across the network has expired by comparing an elapsed time that has elapsed since the authorization approval message was received across the network to a threshold time;
   automatically generating, at the payment service provider computer operatively coupled with the memory, a request message for re-authorizing the reservation of money or credit in the customer account for the payment transaction based on the elapsed time exceeding the threshold time, thereby obtaining an estimation that the reservation of money or credit across the network has expired;
   automatically sending the request message from the payment service provider computer across the network to the payment processor;
   receiving from the payment processor an approval or rejection for the re-authorizing of the reservation;
   automatically adjusting the threshold time for future payment transactions involving the payment processor based on the received approval or rejection, wherein the threshold time is adjusted downward when the re-authorizing of the reservation is approved; and
   sending a subsequent request message to the payment processor for a subsequent payment transaction based on a subsequent elapsed time since a subsequent authorization approval message was received exceeding the adjusted threshold time.

13. The machine-readable non-transitory storage medium of claim 12 wherein the operations further comprise:
   automatically sending to the payment processor a capture request corresponding to the authorization approval message based on receiving the rejection for the re-authorizing; and
   receiving from the payment processor a response for the capture request.

14. The machine-readable non-transitory storage medium of claim 12 wherein the operations further comprise:
   automatically sending to the payment processor a capture request for the re-authorizing based on receiving the approval for the re-authorizing.

15. The machine-readable non-transitory storage medium of claim 12, wherein the threshold time is increased when the re-authorizing of the reservation is rejected.

16. A computer system executing instructions in a computer program, comprising:
   a payment service provider computer;
   a memory storing computer program instructions and operatively coupled with the payment service provider computer, wherein the payment service provider computer is configured to execute the computer program instructions, the computer program instructions comprising:
   program code for receiving, at the payment service provider computer, an authorization approval message from a payment processor across a network, the authorization approval message confirming that a customer account has money or credit for a payment transaction and that the money or credit has been reserved for a reservation across said network for the payment transaction;
   program code for estimating, at the payment service provider computer, whether the reservation of money or credit across the network has expired by comparing an elapsed time that has elapsed since the authorization approval message was received across the network to a threshold time;
   program code for automatically generating, at the payment service provider computer, a request message for re-authorizing the reservation of money or credit in the customer account for the payment transaction based on the elapsed time exceeding the threshold time, thereby obtaining an estimation that the reservation of money or credit across the network has expired;
   program code for automatically sending the request message from the payment service provider computer across the network to the payment processor;
   program code for receiving from the payment processor an approval or rejection for the re-authorizing of the reservation;
   program code for automatically adjusting the threshold time for future payment transactions involving the payment processor based on the received approval or rejection, wherein the threshold time is adjusted downward when the re-authorizing of the reservation is approved; and
   program code for sending a subsequent request message to the payment processor for a subsequent payment transaction based on a subsequent elapsed time since a subsequent authorization approval message was received exceeding the adjusted threshold time.

17. The computer system of claim 16, wherein the computer program instructions further comprise:
   program code for automatically sending to the payment processor a capture request corresponding to the authorization approval message based on receiving the rejection for the re-authorizing; and
   program code for receiving from the payment processor a response for the capture request.

18. The computer system of claim 16, wherein the computer program instructions further comprise:
   program code for automatically sending to the payment processor a capture request for the re-authorizing based on receiving the approval for the re-authorizing.

19. The computer system of claim 16, wherein the threshold time is increased when the re-authorizing of the reservation is rejected.

* * * * *